Nov. 8, 1955
K. C. LOFTIN ET AL
2,722,758
COMBINED RAKING, CUTTING AND PUSHING
ATTACHMENT FOR TRACTORS
Filed June 19, 1950
2 Sheets-Sheet 1
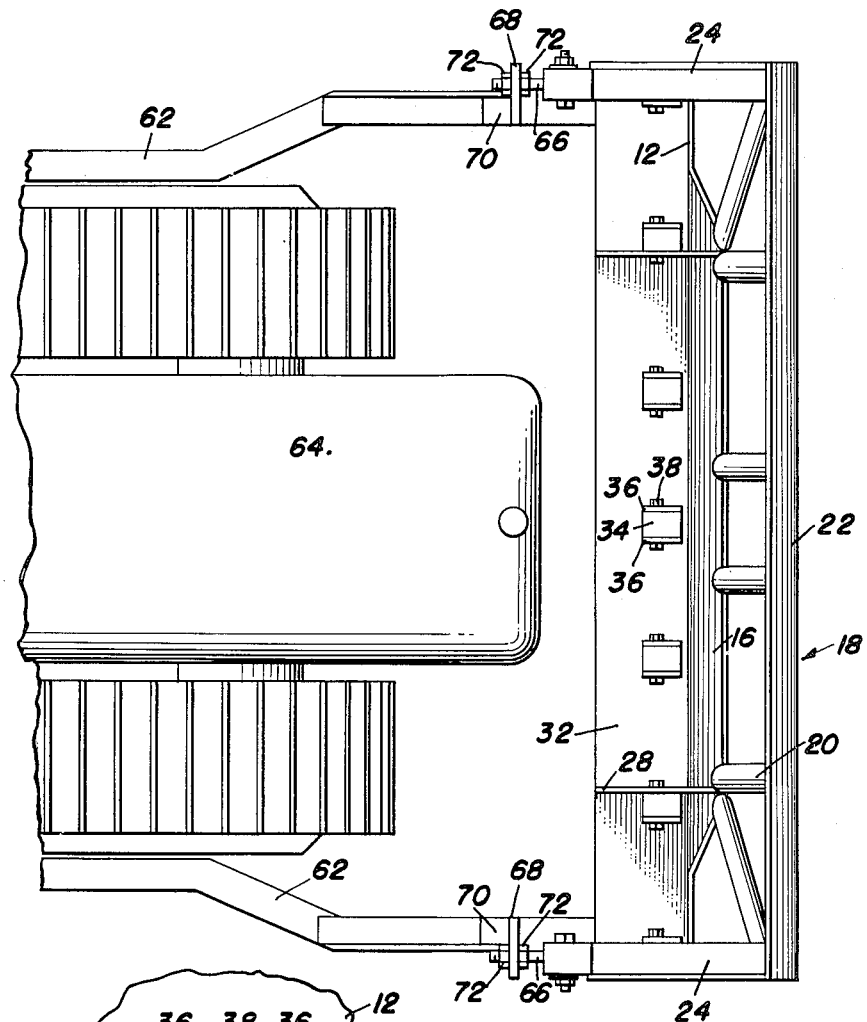
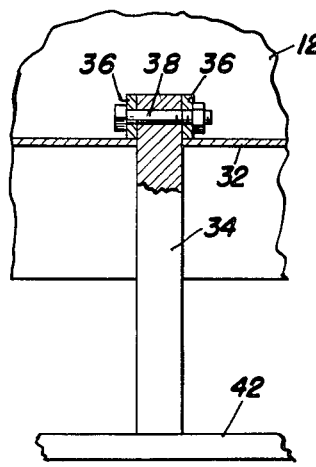
Kenthal C. Loftin
Lowenthal B. Loftin
Elva A. Woodard
Inventors
By *Clarence A. O'Brien
and Harvey B. Jacobson*
Attorneys

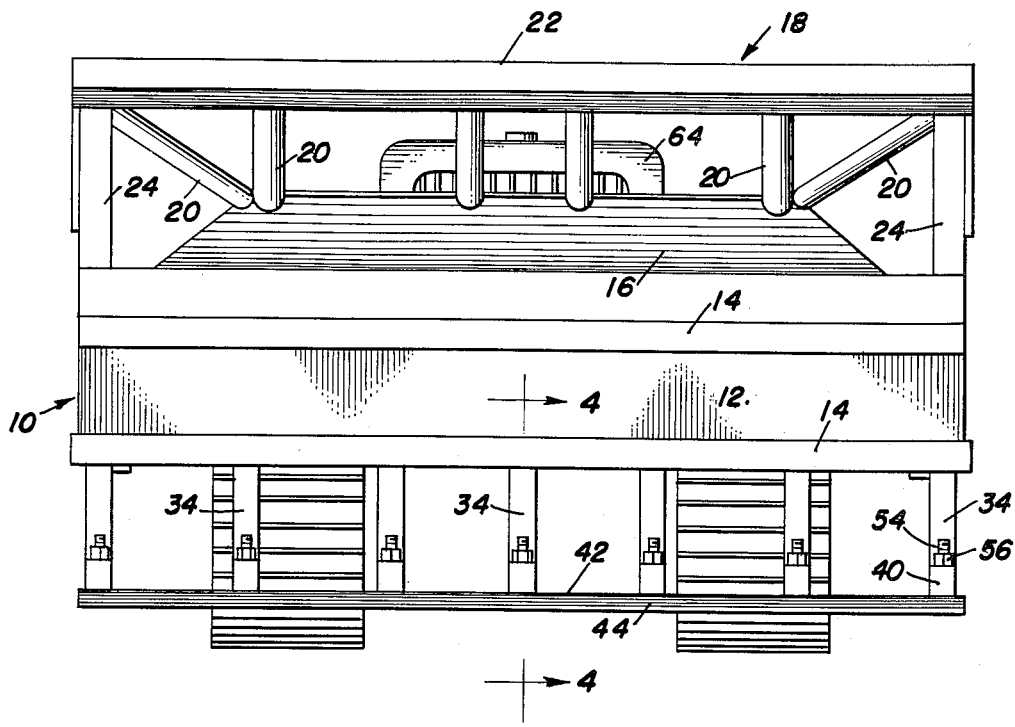
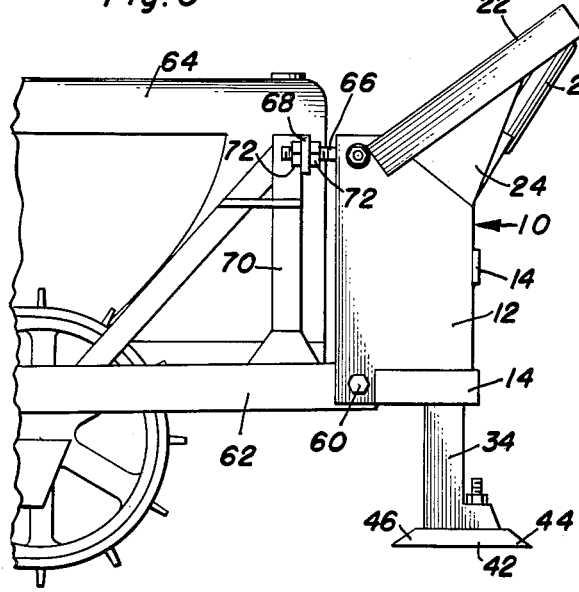
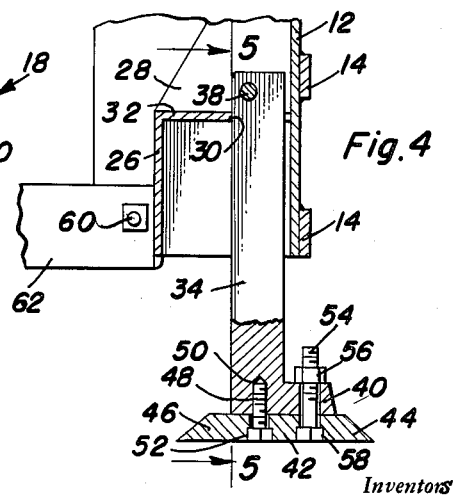

United States Patent Office 2,722,758
Patented Nov. 8, 1955

2,722,758

COMBINED RAKING, CUTTING AND PUSHING ATTACHMENT FOR TRACTORS

Kenthal C. Loftin, Lowenthal B. Loftin and Elva A. Woodard, Delhi, La.

Application June 19, 1950, Serial No. 168,902

1 Claim. (Cl. 37—2)

This invention relates to new and useful improvements in clearing devices and the primary object of the present invention is to provide an attachment for tractors that is employed for cutting or piling brush, trees and the like.

Another important object of the present invention is to provide a combined raking, cutting and pushing attachment for tractors including a plurality of spaced parallel legs constituting rake teeth and a cutting blade detachably secured to and supported by the legs and having leading and trailing beveled cutting edges to effectively cut brush or the like regardless of whether the tractor is moving forwardly or rearwardly.

Yet another important object of the present invention is to provide a combined rake, cutter and pusher attachment for the vertically raisable and lowerable arms of a tractor so that the device can ride upon the ground or be raised up to approximately five feet above the ground.

A further object of the present invention is to provide a tractor attachment including a plurality of spaced parallel rake forming legs supporting a cutting blade at their lower ends with the legs spaced apart sufficiently to allow all dirt to sift out of brush and thereby prevents dirt in piles, making the trees and brush easier to burn.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary plan view of a crawler type tractor and showing the present invention applied thereto;

Figure 2 is a front elevational view of Figure 1;

Figure 3 is a side elevational view of Figure 2;

Figure 4 is an enlarged vertical sectional view taken substantially on the plane of section line 4—4 of Figure 2; and, Figure 5 is a sectional view taken substantially in the plane of section line 5—5 of Figure 4.

Referring now to the drawings in detail, wherein for the purpose of illustration, there is disclosed a preferred embodiment of the present invention, the numeral 10 represents a frame composed of an elongated U-shaped plate member 12 that is reinforced and strengthened by any suitable number of strips 14 that are welded to the plate member.

The upper portion of the plate member 12 is formed with an upwardly and forwardly inclined extension 16 that supports an overhang 18. The overhang consists of a plurality of tubular braces 20 that are welded or otherwise fixed to the extension 16 and a U-shaped contact member 22. The ends of the member 12 are braced to the member 22 by brace bars 24.

A hollow beam 26 is secured by welding or the like to the rear and inner face of the member 12. The beam 26 is braced to the member 12 and extension 16 by a plurality of vertical webs 28 that are preferably welded to the beam 26, the member 12 and the extension 16.

Longitudinally spaced apertures 30 are provided in the horizontal portion 32 of the beam 26 and receive the upper ends of depending legs or bars 34. Pairs of ears 36 are welded to the horizontal portion, adjacent the apertures 30, and receive the upper ends of the legs 34 therebetween. Horizontal bolts 38 extend through the upper ends of the legs and each pair of ears and receive nuts for attaching the legs to the beam 26.

Flanges 40 are provided at the lower ends of the legs 34 and rest upon an elongated flat cutter blade 42 having forward and rear beveled cutting edges 44 and 46. Bolts 48 extend upwardly through the blade 42 and are threaded in bores 50 in the lower ends of the arms 34. The heads of the bolts 48 are seated in recesses 52 in the lower face of the blade 42.

Additional bolts 54 extend upwardly through the blade 42 and the flanges 40 and receivably engage nuts 56. The heads of the bolts 54 are seated in additional recesses or countersinks 58 in the lower face of the blade 42.

The lower end corners of the member 12 are horizontally apertured to receive horizontal pivots or bolts 60 that are secured to the lift arms 62 of a crawler type tractor 64. The upper end corners of the member 12 pivotally support bolts 66 that extend through ears 68 at the upper ends of post 70 rising from the arms 62. Nuts 72 threaded on the bolts 66 permit adjustment of the member 12 and its associated parts about the pivots 60.

In practical use of the present invention, the member 12 and overhang 18 function as a pushing means, the legs 34 as rake teeth and the blade 42 as a cutting means. The attachment is selectively raised and lowered by and with the arms 62 and may slide upon the ground or be utilized for cutting and raking brush, trees and the like above the ground. The bars or legs 34 will rake the brush and prevent the accumulation of dirt piles.

Having described the invention, what is claimed as new is:

For use with a crawler tractor having a pair of vertically swingable lift arms, a device mountable on the arms for raising and lowering with the arms, said device comprising a rigid frame member extending transversely between and supported on the arms, horizontal pivots securing said frame member to the arms, adjustable connecting means between the frame member and the arms for adjusting the frame member about its pivots, a plurality of spaced parallel legs depending from the frame, flanges at the lower ends of the legs, an elongated flat blade underlying the frame and including forward and rear beveled cutting edges, bolts extending upwardly through the blade, the lower ends of said legs having threaded bores threadingly receiving said bolts, said blade having recesses receiving the heads of said bolts, and fasteners securing the blade to said flanges, said frame member including a forwardly and upwardly inclined, rigid overhang extending forwardly of the blade to engage a tree whose roots are being severed by the blade.

References Cited in the file of this patent

UNITED STATES PATENTS

| 2,173,406 | Wilkinson | Sept. 19, 1930 |
| 2,279,869 | Houston | Apr. 14, 1942 |
| 2,292,904 | Shollenberger | Aug. 11, 1942 |
| 2,295,458 | Edwards | Sept. 8, 1942 |
| 2,304,282 | Ross | Dec. 8, 1942 |
| 2,309,223 | Staring | Jan. 26, 1943 |
| 2,336,124 | Phoenix | Dec. 7, 1943 |
| 2,354,560 | Troup | July 25, 1943 |
| 2,375,801 | LeTourneau | May 15, 1945 |
| 2,573,921 | McNamara | Nov. 6, 1951 |
| 2,584,485 | McNeel | Feb. 5, 1952 |